United States Patent
Venugopal et al.

(10) Patent No.: US 12,005,692 B2
(45) Date of Patent: Jun. 11, 2024

(54) NONWOVEN LAMINATE

(71) Applicant: Carl Freudenberg KG, Weinheim (DE)

(72) Inventors: Arun Prasad Venugopal, Weinheim (DE); Gerhard Schoepping, Zwingenberg (DE)

(73) Assignee: CARL FREUDENBERG KG, Weinheim (DE)

( * ) Notice: Subject to any disclaimer, the term of this patent is extended or adjusted under 35 U.S.C. 154(b) by 513 days.

(21) Appl. No.: 16/932,852

(22) Filed: Jul. 20, 2020

(65) Prior Publication Data

US 2021/0023815 A1    Jan. 28, 2021

(30) Foreign Application Priority Data

Jul. 22, 2019 (EP) .................................. 19187652

(51) Int. Cl.
*B32B 5/26* (2006.01)
*B32B 5/02* (2006.01)
(Continued)

(52) U.S. Cl.
CPC ............... *B32B 5/26* (2013.01); *B32B 5/022* (2013.01); *B32B 5/08* (2013.01); *B32B 5/267* (2021.05);
(Continued)

(58) Field of Classification Search
CPC .......... B32B 2307/54; B32B 2307/546; B32B 2307/5825; B32B 2307/718;
(Continued)

(56) References Cited

U.S. PATENT DOCUMENTS

| | | |
|---|---|---|
| 5,366,792 A | 11/1994 | Shirayanagi |
| 2008/0026177 A1 | 1/2008 | Vollmert |

(Continued)

FOREIGN PATENT DOCUMENTS

| | | | |
|---|---|---|---|
| EP | 3489008 A1 | | 9/2019 |
| JP | 2018089833 A | * | 6/2018 |
| WO | WO 2016183079 A1 | | 11/2016 |

*Primary Examiner* — Matthew D Matzek
(74) *Attorney, Agent, or Firm* — LEYDIG, VOIT & MAYER, LTD.

(57) ABSTRACT

The invention provides a nonwoven laminate, comprising in order (A) to (E): a spunbond nonwoven layer (A) comprising fibres, which comprise polyethylene terephthalate (PET) and copolyester; an optional spunbond nonwoven layer (B) comprising fibres, which comprise polyethylene terephthalate (PET) and copolyester, the nonwoven layer (B) having a higher copolyester content than nonwoven layer (A); a needled staple fibre nonwoven layer (C), comprising: monocomponent polyethylene terephthalate (PET) staple fibres (c1), and multicomponent staple fibres (c2), which comprise at least a polyethylene terephthalate (PET) component and a copolyester component; an optional spunbond nonwoven layer (D) comprising fibres, which comprise polyethylene terephthalate (PET) and copolyester, the nonwoven layer (D) having a higher copolyester content than nonwoven layer (E); a spunbond nonwoven layer (E) comprising fibres, which comprise polyethylene terephthalate (PET) and copolyester; wherein all layers are melt-bonded to each other.

17 Claims, 5 Drawing Sheets

(51) Int. Cl.
    *B32B 5/08*     (2006.01)
    *B32B 7/12*     (2006.01)
    *B32B 37/04*     (2006.01)
    *D04H 1/06*     (2012.01)
    *D04H 1/435*     (2012.01)
    *D04H 1/46*     (2012.01)
    *D04H 1/55*     (2012.01)
    *D04H 1/559*     (2012.01)

(52) U.S. Cl.
    CPC ............... *B32B 7/12* (2013.01); *B32B 37/04* (2013.01); *D04H 1/06* (2013.01); *D04H 1/435* (2013.01); *D04H 1/46* (2013.01); *D04H 1/55* (2013.01); *D04H 1/559* (2013.01); *B32B 2250/03* (2013.01); *B32B 2250/05* (2013.01); *B32B 2250/20* (2013.01); *B32B 2250/40* (2013.01); *B32B 2262/0276* (2013.01); *B32B 2262/0284* (2013.01); *B32B 2262/12* (2013.01); *B32B 2262/144* (2021.05); *B32B 2307/54* (2013.01); *B32B 2307/546* (2013.01); *B32B 2307/5825* (2013.01); *B32B 2307/718* (2013.01); *B32B 2307/736* (2013.01); *B32B 2367/00* (2013.01); *B32B 2605/08* (2013.01)

(58) Field of Classification Search
    CPC .......... B32B 2307/736; B32B 2367/00; B32B 2605/08; B32B 2262/0284; B32B 2262/12; B32B 2262/144; B32B 2250/03; B32B 2250/05; B32B 2250/20; B32B 2250/40; B32B 5/08; B32B 5/267; B32B 5/26; B32B 5/022; B32B 7/12; B32B 37/04; B32B 2262/0276; B32B 1/00; B32B 2250/04; B32B 2260/023; B32B 2260/046; B32B 2262/14; B32B 2270/00; B32B 2272/00; B32B 2307/102; B32B 7/028; B32B 5/06; B32B 7/10; D04H 1/435; D04H 1/46; D04H 1/55; D04H 1/559; D04H 1/06; D04H 1/4382; D04H 3/14; D04H 3/16
    USPC ................ 442/381, 382, 383, 401, 402, 403
    See application file for complete search history.

(56) References Cited

U.S. PATENT DOCUMENTS

| | | | |
|---|---|---|---|
| 2010/0189936 A1* | 7/2010 | Irie | ........ D04H 3/011 442/364 |
| 2015/0004860 A1 | 1/2015 | Harashige | |
| 2016/0288451 A1* | 10/2016 | Camp | ....... B32B 5/26 |

* cited by examiner

NONWOVEN LAMINATE

CROSS-REFERENCE TO PRIOR APPLICATIONS

Priority is claimed to European Patent Application No. EP 19187652.3, filed on Jul. 22, 2019, the entire disclosure of which is hereby incorporated by reference herein.

FIELD

The invention relates to nonwoven laminates, articles comprising such nonwoven laminates, uses thereof and processes for producing the same.

BACKGROUND

Nonwoven laminates are used in various applications. Nonwoven laminates are for example used as underbody shield materials for automotive applications. Underbody shield materials for automotive applications are usually heated and shaped to provide desired underbody shields for placement within a given vehicle. Such underbody shields must typically meet a number of stringent performance specifications. In order to meet such specifications, different underbody shield materials have generally been suggested in the art.

Some generally considered underbody shield materials comprise composite articles. WO 2016/183079 A1 describes such a composite article which comprises a porous core layer. The core layer contains a plurality of reinforcing fibres and a lofting agent. However, the admixture of reinforcing fibres may worsen the processability of the core layer. Additionally, the admixture of lofting agent may lead to dimensional instability when the article is heated and shaped. The admixture of reinforcing fibres and/or lofting agent may furthermore increase the costs of the composite article.

Some generally considered underbody shield materials comprise polyolefins like polypropylene. EP 3 489 008 A1 describes a base material nonwoven fabric having a two-layer structure of a long fibre nonwoven fabric layer and a short fibre nonwoven fabric layer. Both nonwoven fabric layers comprise polyester. A polypropylene layer is localized in the vicinity of an interface between the two nonwoven fabric layers. Generally, polypropylene-containing products are less easy to recycle. Further, polypropylene has a melting point of about 160° C. so that it can potentially lead to inferior heat resistance characteristics and flammability problems. Also, polyester fibres and polypropylene have different properties in terms of e.g. elongation, tensile strength and the like. The simultaneous use of polyester and polypropylene can therefore potentially impede tailoring the characteristics of a final product.

Some generally considered underbody shield materials comprise staple fibre layers which are needled to spunbond layers. However, upon heating such a layered material, the staple fibre layers will typically shrink, whereas the spunbond layers will typically not shrink. This can result in a so-called elephant skin effect. The elephant skin effect itself can result in inferior aesthetics. The elephant skin effect may further result in a moulded product which is not flat. A moulded product, which is not flat, will typically have reduced bending strength. US 2016/0288451 A1 describes a needled staple fibre material as a core layer for a mouldable layered structure which is particularly suited for vehicular underbody applications. At least one spunbond polyester layer is mechanically bonded to the core layer. The mechanical bonding is achieved by needling the spunbond polyester layer into the core layer. The stable fibres of the core layer are disturbed by the mechanical bonding. In the resulting layered structure, the stable fibres of the core layer at least partially penetrate through the spunbond polyester layer and protrude from that surface of the spunbond polyester layer, which is opposite to the core layer. It may be desirable to further improve some of the properties of the described layered structure.

There is a general desire for improvement of nonwoven laminates known in the art, in particular for use in underbody shield applications.

SUMMARY OF THE INVENTION

It is an object of the present invention to provide a nonwoven laminate which at least partially overcomes the drawbacks encountered in the art.

It is another object of the present invention to provide a nonwoven laminate which can be easily heated and shaped to provide a desired configuration, in particular a nonwoven laminate which is dimensionally stable when it is heated and shaped.

It is another object of the present invention to provide a nonwoven laminate which can contribute to a reduction of costs of articles which comprise the nonwoven laminate.

It is another object of the present invention to provide a nonwoven laminate which has improved recyclability, improved heat resistance and nonflammability characteristics and/or advantageously light weight.

It is another object of the present invention to provide a nonwoven laminate which has homogeneous mechanical properties, in particular homogeneous elongation, tensile strength and/or heat-shrinking.

It is a particular object of the present invention to provide a nonwoven laminate which can result in a moulded article which shows reduced elephant skin effect.

It is a particular object of the present invention to provide a nonwoven laminate which can result in a moulded article which exhibits enhanced acoustic absorption.

It is also an object of the present invention to provide a moulded article comprising a nonwoven laminate which at least partially overcomes the drawbacks encountered in the art.

It is also an object of the present invention to provide a use of a nonwoven laminate or of a moulded article comprising such a nonwoven laminate, which nonwoven laminate at least partially overcomes the drawbacks encountered in the art.

It is also an object of the present invention to provide a process for producing a nonwoven laminate which at least partially overcomes the drawbacks encountered in the art.

DETAILED DESCRIPTION OF THE INVENTION

Surprisingly, it was found that the problem underlying the invention is solved by nonwoven laminates, moulded articles, uses and processes according to the claims. Further embodiments of the invention are outlined throughout the description.

Subject of the invention is a nonwoven laminate, comprising in order (A) to (E):
  a spunbond nonwoven layer (A) comprising fibres, which comprise polyethylene terephthalate (PET) and copolyester;

an optional spunbond nonwoven layer (B) comprising fibres, which comprise polyethylene terephthalate (PET) and copolyester, the nonwoven layer (B) having a higher copolyester content than nonwoven layer (A);

a needled staple fibre nonwoven layer (C), comprising:
monocomponent polyethylene terephthalate (PET) staple fibres (c1), and
multicomponent staple fibres (c2), which comprise at least a polyethylene terephthalate (PET) component and a copolyester component;

an optional spunbond nonwoven layer (D) comprising fibres, which comprise polyethylene terephthalate (PET) and copolyester, the nonwoven layer (D) having a higher copolyester content than nonwoven layer (E);

a spunbond nonwoven layer (E) comprising fibres, which comprise polyethylene terephthalate (PET) and copolyester;

wherein all layers are melt-bonded to each other.

Nonwovens are conventional in the art. A nonwoven is neither woven nor knitted. In general, a nonwoven is a textile fabric as defined in DIN EN ISO 9092:2018.

A spunbond generally refers to a fabric comprising theoretically endless fibres which are drawn from melted fibre raw material. It is preferred that spunbond nonwoven layers (A), (B), (D) and (E), respectively, are made of continuous filament calendared together in the form of a sheet.

A staple fibre generally refers to a fibre of discrete length. A group of staple fibres has an average length of the fibres in the group, which average length is referred to as staple length.

A needled nonwoven layer generally refers to a layer which comprises a plurality of fibres, which fibres have been intermingled using needles.

Polyethylene terephthalate is a copolymer of terephthalic acid and ethane-1,2-diol (also referred to as ethylene glycol).

Copolyester is a copolymer of a first diacid monomer and a first diol monomer, together with one or both of at least one second different diacid monomer and at least one second different diol monomer. Herein, a diacid monomer preferably refers to a dicarboxylic acid monomer.

Melt-bonding is conventional in the art. Melt-bonding generally refers to a technique of joining at least two polymeric, usually thermoplastic, materials by applying energy to at least one of the at least two materials and by simultaneously bringing the at least two materials into intimate contact, followed by cooling. The melt-bonding can also be referred to as thermal bonding or chemical bonding.

In the inventive nonwoven laminate, layers (A) to (E) are melt-bonded in the given order. This can be achieved by forming a stack of the layers and melt-bonding the stack.

The melt-bonding of the layers to each other can lead to high homogeneity of the heat-shrinking properties of the nonwoven laminates. The high homogeneity of the heat-shrinking properties can reduce the formation of elephant skin during moulding. Due to reduced formation of elephant skin, the inventive nonwoven laminate can have appealing aesthetics and a higher bending strength after moulding.

The melt-bonding of the layers to each other can also confer high dimensional stability to the nonwoven laminate when heated and shaped.

All layers (A), (B), (C), (D) and (E) comprise polyethylene terephthalate. Polyethylene terephthalate is herein also referred to as "PET". The polyethylene terephthalate can be virgin polyethylene terephthalate (which was not recycled), recycled polyethylene terephthalate (also referred to as "r-PET"), or a mixture of virgin and recycled polyethylene terephthalate. Virgin polyethylene terephthalate can allow for a more precise setting of mechanical properties of the inventive nonwoven laminate. Recycled polyethylene terephthalate can allow for reduced costs of the inventive nonwoven laminate.

The polyethylene terephthalate comprised by all layers (A), (B), (C), (D) and (E) can confer high homogeneity of mechanical properties of the inventive nonwoven laminate. In particular, the homogeneity of elongation and tensile strength of the inventive nonwoven laminate can thereby be enhanced. The inventive nonwoven laminate can thereby be easily heated and shaped to provide a desired configuration. The inventive nonwoven laminate can thereby be dimensionally stable when heated and shaped.

The polyethylene terephthalate comprised by all layers (A), (B), (C), (D) and (E) can provide a relatively low basis weight to the layers and the overall laminate, respectively.

The polyethylene terephthalate comprised by all layers (A), (B), (C), (D) and (E) has a comparably high melting point of about 260° C. The inventive nonwoven laminate can thereby have high heat resistance and nonflammability characteristics. Melting points are herein preferably melting points determined according to DIN ISO 11357-3:2013.

The polyethylene terephthalate comprised by all layers (A), (B), (C), (D) and (E) is comparably inexpensive. The inventive nonwoven laminate can thereby contribute to a reduction of costs of articles which comprise the inventive nonwoven laminate.

All layers (A), (B), (C), (D) and (E) comprise copolyester. The copolyester can be amorphous copolyester, crystalline copolyester or a mixture of amorphous copolyester and crystalline copolyester. If present, the optional layer (B) has a higher copolyester content than layer (A), and optional layer (D) has a higher copolyester content than layer (E). The respectively higher copolyester content can strengthen the bonding of layer (A) and/or layer (E) to layer (C). The respectively higher copolyester content can thus increase the peel strength of layer (A) and/or layer (E).

The inventive nonwoven laminate may comprise in the given order
layers (A), (B), (C), (D) and (E),
layers (A), (C), (D) and (E),
layers (A), (B), (C), and (E), or
layers (A), (C) and (E), which is particularly preferred.

In such a nonwoven laminate layers (B) and (D) function as adhesive layers. Layers (B) and (D) can increase the bonding between the outer layers (A) and (E) and the core layer (C). Delamination of layer (A) and or layer (E) can be advantageously reduced in such a laminate. A nonwoven laminate comprising in order layers (A), (B), (C), (D) and (E) is preferred from the viewpoint of an increased peel strength.

A nonwoven laminate comprising layers (A), (C) and (E) is preferred from the viewpoint of a simplified producibility. No additional feeding devices for layers (B) and (D) are required for producing such a laminate. The production of such a nonwoven laminate can thereby be simplified. The production of a nonwoven laminate with only layers (A), (C) and (E), i.e. without layers (B) and (D), is further particularly preferred from the viewpoint of cost efficiency.

According to one particular definition of all layers (A), (B), (C), (D) and (E) being melt-bonded to each other, none of layers (A), (B), (C), (D) and (E) is mechanically bonded to any other of layers (A), (B), (C), (D) and (E) in the inventive nonwoven laminate. In other words, there is no entanglement between any two of layers (A), (B), (C), (D) and (E). In particular, none of the fibres comprised by needled staple fibre nonwoven layer (C) extends into any of layers (A), (B), (D), (E) especially not into layer (A) and/or layer (E). More in particular, none of the fibres comprised by needled staple fibre nonwoven layer (C) penetrates through any of layers (A), (B), (D), (E), especially not through layer (A) and/or layer (E). The absence of mechanical bonding can minimize the formation of undesired elephant skin upon heating the layers, so that appealable aesthetics can be achieved. Further, a moulded product produced from the nonwoven laminate without mechanical bonding can be advantageously flat, in particular without wrinkles, a wavy structure, or the like. Further, its bending strength can be increased.

It is preferred that in the inventive nonwoven laminate, none of layers (A), (B), (C), (D) and (E) is needled to any other of layers (A), (B), (C), (D) and (E). Such an undesired needling encompasses mechanical needling as well as water jet needling, which is also known as hydroentanglement. This can prevent the formation of undesired elephant skin upon heating the layers. In turn, appealable aesthetics can be achieved. A moulded product produced from the preferred nonwoven laminate is usually flat and without wrinkles or the like, thereby typically increasing its bending strength.

It is preferred that in the inventive nonwoven laminate, the needled staple fibre nonwoven layer (C) is heat-shrunk. Preferably, the needled fibres upon exposure to heat shrink in both machine and cross directions. A heat-shrunk needled staple fibre nonwoven layer can avoid undesired further shrinkage. This can avoid undesired formation of elephant skin during a subsequent moulding process.

It is preferred that in the inventive nonwoven laminate, less than 20%, more preferably less than 10% of all fibres contained in the nonwoven laminate are free of PET and free of copolyester. Most preferably, all fibres contained in the nonwoven laminate are made of PET, copolyester or mixtures thereof. When all fibres contained in the nonwoven laminate are predominantly and preferably exclusively made of PET, copolyester or mixtures thereof, the nonwoven laminate can have relatively low costs, relatively low weight and relatively high peel strength.

It is preferred that the inventive nonwoven laminate does not contain polyolefin, in particular not polypropylene. The nonwoven laminate can thereby be recycled more easily. The heat resistance characteristics and nonflammability characteristics of the nonwoven laminate can thereby be increased. The homogeneity of mechanical characteristics of the nonwoven laminate, especially its elongation and tensile strength, are thereby be increased. This can allow an easier tailoring of the characteristics of a product comprising the nonwoven laminate.

It is preferred that the inventive nonwoven laminate does not contain inorganic reinforcements, in particular not glass fibres. The absence of inorganic reinforcements, in particular the absence of glass fibres, can ease the processability of the nonwoven laminate. The absence of inorganic reinforcements, in particular the absence of glass fibres, can lower the costs for an article comprising the nonwoven laminate.

It is preferred that the inventive nonwoven laminate does not contain any lofting agent. The absence of any lofting agent can increase the dimensional stability of the nonwoven laminate when the nonwoven laminate is heated and shaped. The absence of any lofting agent can lower the costs for an article comprising the nonwoven laminate.

It is preferred that the inventive nonwoven laminate has at least one of the following characteristics:
  a bending strength according to ISO 178:2019-04 of ≥330 MPa;
  a tensile strength according to ASTM 5034:2009 of ≥780 N; and/or
  a tear strength according to DIN EN 29073-3:1992-08 of ≥110 N.

A bending strength of ≥330 MPa, a tensile strength of ≥780 N and/or a tear strength of ≥110 N can lead to high wear resistance of the nonwoven laminate. A bending strength of ≥330 MPa, a tensile strength of ≥780 N and/or a tear strength of ≥110 N can increase the acoustic absorption of the nonwoven laminate.

Form the viewpoints of even higher wear resistance and increased acoustic absorption of the nonwoven laminate, it is particularly preferred that the inventive nonwoven laminate has a bending strength of ≥330 MPa and a tensile strength of ≥780 N; or a bending strength of ≥330 MPa and a tear strength of ≥110 N; or a tensile strength of ≥780 N and a tear strength of ≥110 N. It is most preferred that the inventive nonwoven laminate has a bending strength of ≥330 MPa, a tensile strength of ≥780 N and a tear strength of ≥110 N.

It is more preferred that the inventive nonwoven laminate has a bending strength of ≥370 MPa, even more preferred of ≥400 MPa and still more preferred of ≥430 MPa. With the respectively increasing binding strength, wear resistance and acoustic absorption of the nonwoven laminate can be further increased.

It is more preferred that the inventive nonwoven laminate has a tensile strength of ≥850 N, even more preferred of ≥900 N and still more preferred of ≥950 N. With the respectively increasing tensile strength, wear resistance and acoustic absorption of the nonwoven laminate can be further increased.

It is more preferred that the inventive nonwoven laminate has a tear strength of ≥125 N, even more preferred of ≥145 N and still more preferred of ≥165 N. With the respectively increasing tear strength, wear resistance and acoustic absorption of the nonwoven laminate can be further increased.

It is preferred that in the inventive nonwoven laminate, the copolyester in layers (A), (B), (C), (D) and (E) is a copolymer of polyethylene terephthalate. A copolymer of polyethylene terephthalate comprises the monomers terephthalic acid, ethane-1,2-diol, and at least one further different dicarboxylic acid monomer and/or at least one further different diol monomer. A preferred further dicarboxylic acid monomer is adipic acid. Another preferred further dicarboxylic acid monomer is isophthalic acid. A preferred further diol monomer is cyclohexane dimethanol. A copolymer of polyethylene terephthalate can ease the recyclability of the nonwoven laminate. A copolymer of polyethylene terephthalate can increase the peel strength within the nonwoven laminate. A copolymer of polyethylene terephthalate can reduce the costs of the raw materials for the nonwoven laminate.

It is preferred that in the inventive nonwoven laminate, the copolyester in layers (A), (B), (C), (D) and (E) has a melting point of ≤240° C. It is more preferred that the copolyester, in particular the copolyester in layers (B), (C) and (D), has a melting point of ≤220° C., further preferred of ≤210° C., even more preferred of ≤200° C. and still more preferred of ≤190° C., in particular of =180° C. A copolyester having a melting point of ≤240° C. can reduce the energy required for melt-bonding layers (A), (B), (C), (D) and (E) to each other. A copolyester having a melting point of ≤240° C. can reduce the energy required for producing spunbond layers (A), (B), (D) and (E). The energy reductions can increase continuously when going to the lower melting points of ≤220° C., ≤210° C., ≤200° C., ≤190° C. and =180° C., respectively.

It is preferred that in the inventive nonwoven laminate, the copolyester in layers (A) and (E) has a melting point which is higher than the melting point of the copolyester in layer (C), more preferably higher by ≥20° C., still more preferably higher by ≥30° C., and even further preferably higher by ≥35° C. In this way, a stronger bond between the layers of the nonwoven laminate after melt-bonding can be achieved.

For the case that layers (B) and (D) are not present, which is particularly preferred, it is more preferred that the copolyester in layers (A) and (E) has a melting point of 205 to 240° C., even more preferred of 210 to 230° C. and still more preferred of 210 to 225° C. In this case, the copolyester in layer (C) preferably has a melting point of 160 to 200° C., even more preferred of 170 to 190° C. and still more preferred of 175 to 185° C. This can avoid a delamination of layers (A) and (E) from layer (C).

It is preferred that in the inventive nonwoven laminate, the copolyester in layers (A), (B), (C), (D) and (E) has a melting point of ≥100° C. It is more preferred that the copolyester has a melting point of ≥110° C., even more preferred of ≥140° C. ° C. and still more preferred of ≥160° C. A copolyester having a melting point of ≤100° C. can increase the bonding strength between layers (A), (B), (C), (D) and (E) after melt-bonding.

It is preferred that in the inventive nonwoven laminate, the copolyester in layers (A), (B), (C), (D) and (E) has a melting point in the range of 100 to 240° C., more preferred in the range of 110 to 240° C., even more preferred in the range of 140 to 230° C. and still more preferred in the range of 160 to 225° C. A copolyester having a melting point within these ranges can reduce the energy required for melt-bonding layers (A), (B), (C), (D) and (E) to each other, can reduce the energy required for producing spunbond layers (A), (B), (D) and (E) and can increase the bonding strength between layers (A), (B), (C), (D) and (E) after melt-bonding.

It is preferred that in the inventive nonwoven laminate, the copolyester in layers (A), (B), (D) and (E), in particular in layers (A) and (E), is basically neutral, i.e. has a pH value of 6.5 to 7.5, more preferably of 6.8 to 7.2, and still more preferably of 7.0. This can avoid undesired chemical interaction of the surfaces of the nonwoven laminate with the environment.

It is preferred that in the inventive nonwoven laminate, the copolyester in layers (A), (B), (D) and (E), in particular in layers (A) and (E), has a density of 1.1 to 1.6 g/cm3, more preferably of 1.2 to 1.5 g/cm3, and still more preferably of 1.3 to 1.4 g/cm3. The density is determined according to DIN EN ISO 1183-1:2019-09. Such a density can lead to a laminate of appropriate strength, while avoiding excessive costs.

It is more preferred that in the inventive nonwoven laminate, the copolyester in layers (A), (B), (C), (D) and (E) is a copolymer of polyethylene terephthalate and that the copolymer simultaneously has a melting point of ≤240° C. This can lead to a simultaneous increase of peel strength, lowering of costs and lowering of required energy for melt-bonding the layers and for producing the spunbond layers.

When layers (B) and (D) are present in the inventive nonwoven laminate, it is preferred that layers (A) and (E) comprise 2% to 30% copolyester, more preferred 5 to 25% copolyester. When layers (B) and (D) are not present in the inventive nonwoven laminate, it is preferred that layers (A) and (E) comprise at least 30% copolyester, more preferred 30 to 70% copolyester, in particular preferred at least 40% copolyester, at least 50% copolyester, at least 60% copolyester, or at least 70% copolyester. Such a copolyester content can avoid a wavy structure of the laminate. Such a copolyester content can further achieve an increased bending strength of the laminate. Herein, "%" always refers to % by weight.

When layers (B) and (D) are present and layers (A) and (E) comprise 2% to 30% copolyester, it can become easier to melt-bond layer (A) to layer (B) or layer (C), and it can likewise become easier to melt-bond layer (E) to layer (D) or layer (C). When layers (A) and (E) comprise 2% to 30% copolyester, the peel strength of layers (A) and (E) can be increased. When layers (A) and (E) comprise 5% to 25% copolyester, the melt-bonding easiness and the peel strength of layers (A) and (E) can even further increase.

When layers (A) and (E) comprise at least 30%, more preferably at least 40%, at least 50%, at least 60% or at least 70% copolyester, a laminate without layers (B) and (D) can have increased peel strength. That is, neither layer (B) nor layer (D) may then be needed for an increased peel strength. The costs for the laminate can thereby be lowered. The production of the laminate can thereby be simplified. In such a case in which layers (B) and (D) are preferably not present, it is particularly preferred that the copolyester in layers (A) and (E) has a melting point of 205 to 240° C., even more preferred of 210 to 230° C. and still more preferred of 210 to 225° C. In this case, the copolyester in layer (C) preferably has a melting point of 160 to 200° C., even more preferred of 170 to 190° C. and still more preferred of 175 to 185° C. This can in particular avoid a delamination of layers (A) and (E) from layer (C).

It is preferred that the inventive nonwoven laminate comprises spunbond nonwoven layer (B) and/or spunbond nonwoven layer (D), the fibres of which consist of copolyester. The presence of spunbond nonwoven layer (B) and/or spunbond nonwoven layer (D) can increase the peel strength of layer (A) and/or layer (E). When the fibres of spunbond nonwoven layer (B) and/or spunbond nonwoven layer (D) consist of copolyester, it can become easier to melt-bond all layers of the nonwoven laminate to each other.

It is preferred that the inventive nonwoven laminate comprises spunbond nonwoven layer (B) and/or spunbond nonwoven layer (D), which have a basis weight according to DIN EN 29073-1:1992-08 of 1 to 100 g/m$^2$, preferably of 5 to 50 g/m$^2$, more preferably of 10 to 20 g/m$^2$. The presence of spunbond nonwoven layer (B) and/or spunbond nonwoven layer (D) can increase the peel strength of layer (A) and/or layer (E). When the nonwoven layer (B) and/or spunbond nonwoven layer (D) has a basis weight of 1 to 100 g/m$^2$, preferably of 5 to 50 g/m$^2$, more preferably of 10 to 20 g/m$^2$, a good balance between a light weight of the laminate and a good wear resistance of the laminate can be achieved.

It is more preferred that the inventive nonwoven laminate comprises spunbond nonwoven layer (B) and/or spunbond nonwoven layer (D), the fibres of which consist of copolyester and which simultaneously have a basis weight according to DIN EN 29073-1:1992-08 of 1 to 100 g/m$^2$, preferably of 5 to 50 g/m$^2$, more preferably of 10 to 20 g/m$^2$. The presence of spunbond nonwoven layer (B) and/or spunbond nonwoven layer (D) can increase the peel strength of layer (A) and/or layer (E). Because the fibres of spunbond nonwoven layer (B) and/or spunbond nonwoven layer (D) consist of copolyester, it can become easier to melt-bond all layers of the nonwoven laminate to each other. Simultaneously, because nonwoven layer (B) and/or spunbond nonwoven layer (D) has a basis weight of 1 to 100 g/m², preferably of 5 to 50 g/m², more preferably of 10 to 20 g/m², a good balance between a light weight of the laminate and a good wear resistance of the laminate can be achieved.

It is preferred that in the inventive nonwoven laminate, needled staple fibre nonwoven layer (C) consists of 10 to 90% of monocomponent staple fibres (c1) and 10 to 90% of multicomponent staple fibres (c2). It is more preferred that in the inventive nonwoven laminate, needled staple fibre nonwoven layer (C) consists of 20 to 80% of monocomponent staple fibres (c1) and 20 to 80% of multicomponent staple fibres (c2), even more preferred of 30 to 70% of monocomponent staple fibres (c1) and 30 to 70% of multicomponent staple fibres (c2), still more preferred of 40 to 60% of monocomponent staple fibres (c1) and 40 to 60% of multicomponent staple fibres (c2), and most preferred of 50% of monocomponent staple fibres (c1) and 50% of multicomponent staple fibres (c2).

When the needled staple fibre nonwoven layer (C) consists of 10 to 90% of monocomponent staple fibres (c1) and 10 to 90% of multicomponent staple fibres (c2), the staple fibre nonwoven layer (C) can be more easily produced as a needled layer. When the needled staple fibre nonwoven layer (C) consists of 10 to 90% of monocomponent staple fibres (c1) and 10 to 90% of multicomponent staple fibres (c2), needled staple fibre nonwoven layer (C) is predominantly made of polyethylene terephthalate. This can reduce the weight of the nonwoven laminate, can lead to high heat resistance and nonflammability characteristics of the nonwoven laminate and can reduce the costs of the nonwoven laminate. These effects increase with the ratio of (c1)/(c2) approaching 1, i.e. these effects increase in the order 20-80% (c1)/20-80% (c2); 30-70% (c1)/30-70% (c2); 40-60% (c1)/40-60% (c2); 50% (c1)/50% (c2).

Staple fibres (c1) are monocomponent fibres, i.e. they consist of polyethylene terephthalate. Staple fibres (c2) are multicomponent fibres, i.e. they consist of two or more components. A first component of staple fibres (c2) is polyethylene terephthalate. A second component of staple fibres (c2) is copolyester. One or more additional components of staple fibres (c2) may be present. It is preferred that staple fibres (c2) are bicomponent fibres, i.e. that they consist of polyethylene terephthalate and copolyester. It is preferred that the bicomponent fibres have an island-in-the-sea filament construction, a pie-segment filament construction, a sheath-core filament construction or a side-by-side filament construction, more preferably a sheath-core filament construction. The copolyester component is generally present at a surface of such bicomponent fibres. It is preferred that the staple fibres (c2) have at least one, more preferably two or more and most preferably all of the following characteristics:
  a fineness of 2 to 7 dtex, more preferably 3 to 6 dtex, still more preferably 4 to 6 dtex, determined according to DIN EN ISO 1973:2020-05;
  a fibre length of 30 to 70 mm, more preferably 40 to 60 mm, still more preferably 45 to 55 mm;
  a strength of 1 to 6 g/de, more preferably 2 to 5 g/de, still more preferably 3 to 4 g/de, determined according to DIN EN 13844:2003-04;
  an elongation of 20 to 60%, more preferably 30 to 50%, still more preferably 35 to 55%, determined according to DIN EN ISO 5079:2020-01;
  a crimp of 4 to 10 EA/inch, more preferably 5 to 9 EA/inch, still more preferably 6 to 8 EA/inch, determined according to JIS L-1074;
  a heat shrinkage of 3 to 7%, more preferably 4 to 6%, still more preferably 3.5 to 4.5%, at 75° C.×15 min, determined according to DIN EN 13844:2003-04; and
  a melting point of 160 to 200° C., more preferably 170 to 190° C., still more preferably 175 to 185° C.

When the staple fibres (c2) have at least one, more preferably two or more and most preferably all of the above characteristics, the needled staple fibre nonwoven layer (C) can simultaneously impart strength, flexibility and moldability to the nonwoven laminate.

It is preferred that in the inventive nonwoven laminate, needled staple fibre nonwoven layer (C) has a basis weight according to DIN EN 29073-1:1992-08 of ≤1700 g/m², more preferably of 500 to 1700 g/m². For applications in standard passenger cars, it is preferred that needled staple fibre nonwoven layer (C) has a basis weight of 600 to 1000 g/m², more preferably of 700 to 900 g/m² and most preferably of 800 g/m². For applications in off-road vehicles, it is preferred that needled staple fibre nonwoven layer (C) has a basis weight of 1500 to 1700 g/m², more preferably of 1550 to 1650 g/m² and most preferably of 1600 g/m².

It is more preferred that in the inventive nonwoven laminate, needled staple fibre nonwoven layer (C) consists of 10 to 90% of monocomponent staple fibres (c1) and 10 to 90% of multicomponent staple fibres (c2), and simultaneously has a basis weight according to DIN EN 29073-1:1992-08 of ≤1700 g/m², more preferably of 500 to 1700 g/m². In this way, the staple fibre nonwoven layer (C) can be more easily produced as a needled layer and the nonwoven laminate can be versatile for use in underbody shields for both, standard passenger cars and off-road vehicles.

It is preferred for the inventive nonwoven laminate that
  the copolyester in layers (A), (B), (C), (D) and (E) is a copolymer of polyethylene terephthalate, said copolymer having a melting point of 160 to 240° C.;
  it comprises spunbond nonwoven layer (B) and spunbond nonwoven layer (D), both consisting of copolyester and both having a basis weight according to DIN EN 29073-1: 1992-08 of 10 to 20 g/m²; and
  the needled staple fibre nonwoven layer (C) consists of 40 to 60% of monocomponent staple fibres (c1) and 40 to 60% of multicomponent staple fibres (c2).

Such a preferred nonwoven laminate can be easily heated and shaped to provide a desired configuration. Such a preferred nonwoven laminate can be dimensionally stable when it is heated and shaped. Such a preferred nonwoven laminate can in particular be suited for application as an underbody shield material. Due to the presence of layers (B) and (D), the peel strength can be high. Due to the presence of layers (B) and (D), heat resistance can be high.

It is preferred for the inventive nonwoven laminate that
  it comprises neither spunbond nonwoven layer (B) nor spunbond nonwoven layer (D);
  the copolyester in layers (A), (C) and (E) is a copolymer of polyethylene terephthalate, said copolymer having a melting point of 160 to 240° C.; and
  the needled staple fibre nonwoven layer (C) consists of 40 to 60% of monocomponent staple fibres (c1) and 40 to 60% of multicomponent staple fibres (c2).

Such a preferred a nonwoven laminate can be easily heated and shaped to provide a desired configuration. Such a preferred nonwoven laminate can be dimensionally stable when it is heated and shaped. Such a preferred nonwoven laminate can in particular be suited for application as an underbody shield material. Due to the absence of layers (B) and (D), the costs for the nonwoven laminate can be reduced. Due to the absence of layers (B) and (D), the production of the nonwoven laminate can be simplified.

Subject of the invention is also a moulded article comprising an inventive nonwoven laminate. An inventive moulded article profits from the advantages of the inventive nonwoven laminate described herein. Particularly pronounced is the effect of reduced formation of elephant skin during moulding and the advantages associated therewith.

Subject of the invention is also a use of an inventive nonwoven laminate or an inventive moulded article for an underbody shield or for a wheel arch liner, in particular for an underbody shield. An inventive use for an underbody shield or for a wheel arch liner, in particular for an underbody shield, profits from the advantages of the inventive nonwoven laminate and/or of the inventive moulded article described herein. Particularly pronounced are the effects of enhanced wear resistance and high heat resistance and nonflammability characteristics and the advantages associated therewith.

Subject of the invention is also a process for producing the inventive nonwoven laminate, comprising:
  preparing a needled stable nonwoven layer (C) by needling;
  providing in order layers (A) to (E); and
  melt-bonding layers (A) to (E) to each other.

An inventive process for producing an inventive nonwoven laminate profits from the advantages of the inventive nonwoven laminate. Particularly pronounced is the effect of an easy joining of the layers by melt-bonding, which can result in increased peel strength, and the advantages associated therewith.

BRIEF DESCRIPTION OF THE DRAWINGS

Exemplified embodiments of the invention and aspects of the invention are shown in the figures.

GENERAL CONSTRUCTION AND PRODUCTION OF NONWOVEN LAMINATES

Figure 1:
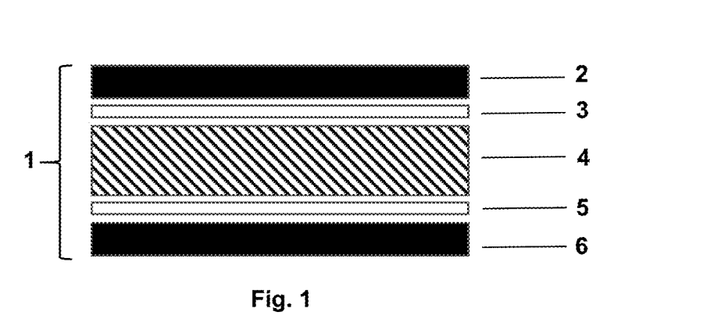
FIG. 1 shows schematically and in exemplified form individual layers of a preferred five-layer nonwoven laminate in accordance with the present invention.

In FIG. 1, a preferred five-layer nonwoven laminate 1 in accordance with the present invention is shown. The five-layer nonwoven laminate 1 comprises a first outer layer 2 (corresponding to layer (A)), a first adhesive layer 3 (corresponding to layer (B)), a core layer 4 (corresponding to layer (C)), a second adhesive layer 5 (corresponding to layer (D)), and a second outer layer 6 (corresponding to layer (E)). The layers of this laminate are not mechanically bonded to each other. Rather, the layers of this laminate are exclusively melt-bonded to each other.

In one embodiment, an advantageous fibre preparation is carried out before needling the staple fibres (c1) and (c2) into core layer 4. More specifically, before the needling process, fibres (c1) and (c2) are opened from bales, mixed and carded. Thereafter, fibres (c1) and (c2) are cross-lapped and passed onto a needling machine. An alternative fibre preparation is done with an airlay or air-laid process in which the opened fibres are collected on a suction band and needled. The core 4 is pre-shrunk by application of heat to avoid shrinkage during a subsequent moulding process. Staple fibres (c1) and/or (c2) preferably have a staple length in the range of 10 mm to 150 mm, more preferably of 40 mm to 100 mm. The core layer 4 preferably has a basis weight between 100 g/m2 and 2000 g/m2.

In one embodiment, the core layer 4 contains a mixture of 10 to 70% of virgin or recycled PET staple fibres (c1) in combination with 30 to 90% of bicomponent fibres (c2). The bicomponent fibres have a sheath-core construction in which the sheath has a melting point that is less than the melting point of the core. The bicomponent fibres preferably assume a variety of geometric configurations, such as side-by-side, sheath-core, segmented pie or island-in-the-sea structures.

Figure 4:
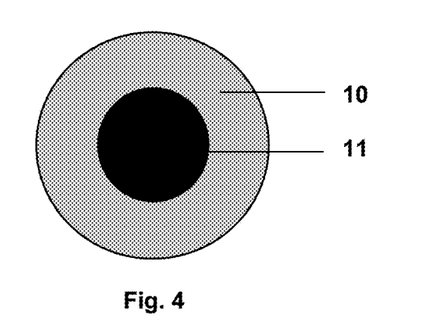
FIG. 4 shows schematically and in exemplified form a sheath-core filament construction which can especially be used in a spunbond nonwoven layer in accordance with the present invention.

In one embodiment, the binder polymer in a bicomponent fibre (c2) is selected based on its melting point. In a preferred sheath-core configuration as shown in FIG. 4, the core 11 preferably consists of PET and the sheath 10 preferably consists of a copolyester having a melting point of <200° C. One particularly preferred binder fibre has a sheath-core filament configuration. The core 11 consists of PET having a melting point of >250° C., i.e. of about 260° C., and the sheath 10 comprises a copolyester having a lower melting point in the range between 110° C. and 180° C.

In one embodiment, the core layer 4 is preshrunk to avoid further shrinkage in a subsequent moulding process. The pre-shrinkage is carried out after the needling process. The needled staple fibres are processed through an oven which is normally set above the melting point of the low melting copolymer. For example, for bicomponent fibres having a sheath polymer which has a melting point of 180° C., the temperature set for the oven may be more than 180° C.

In one embodiment, the outer layers 2 and 6 are coarse denier spunbond nonwoven layers weighing between 10 and 500 g/m$^2$. The spunbond is a PET-based filament having a circular construction with an amount of 1 to 50% of copolyester. The copolyester melts during a moulding process and helps to adhere to the adjacent layer. In addition, the basis weight of layers 2 and 6 is significantly lower than the weight of layer 4. This can be desirable under circumstances where one desires a light overall weight of the final part and cost reduction.

The layer between the core layer 4 and the outer layers 2 and 6, i.e. layer 3 and/or layer 5, is a copolyester-based spunbond nonwoven layer. This copolyester-based spunbond nonwoven layer is used to enhance the bonding of the outer layers to the core layer, i.e. it is an adhesive layer. The adhesive layer 3, 5 comprises a low melting co-polyester. Its weight preferably ranges from 1 g/m$^2$ to 50 g/m$^2$.

Figure 2:
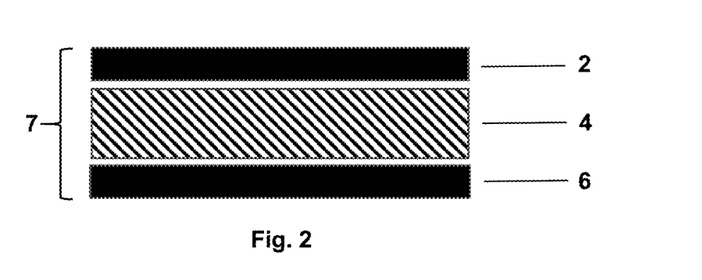
FIG. 2 shows schematically and in exemplified form individual layers of a preferred three-layer nonwoven laminate in accordance with the present invention.

In FIG. 2, a preferred three-layer nonwoven laminate 7 in accordance with the present invention is shown. The layers of this laminate are not mechanically bonded to each other. Rather, the layers of this laminate are exclusively melt-bonded to each other.

In one embodiment, the core layer 4 is pre-shrunk to avoid shrinkage during a subsequent moulding process. The core layer 4 has a basis weight between 100 g/m² and 2000 g/m².

In one embodiment, the outer layers 2 and 6 are coarse denier spunbond nonwoven layers weighing between 10 and 500 g/m². The spunbond is a PET-based filament having a circular construction with an amount of 1 to 50% of copolyester. The copolyester in all present layers 2 to 6 melts during a moulding process and helps to adhere to the adjacent layer. The fibres of the nonwoven laminate, in particular the fibres containing copolyester, may thereby partially or fully lose their fibrous structure in the laminate after melt-bonding. A resulting structure is encompassed by the inventive nonwoven laminate.

The difference between the configuration of FIG. 1 and FIG. 2 is that in FIG. 2 the adhesive layers 3 and 5 are not used. Instead, the amount of copolyester in the outer layers 2 and 6 is usually increased. This can be realized by adopting one of the configurations described in FIGS. 3 to 5.

After the preferred five-layer construction 1 or the preferred three-layer construction 7 is formed as illustrated in FIG. 1 and FIG. 2, i.e. is formed by establishing a melt-bond, but no mechanical bond, between the respective layers, it is in the condition for moulding into a desired shape for a particular vehicular underbody. The layered construction can preferably be moulded in two different ways: in a cold mould process or in a hot mould process.

Figure 3:
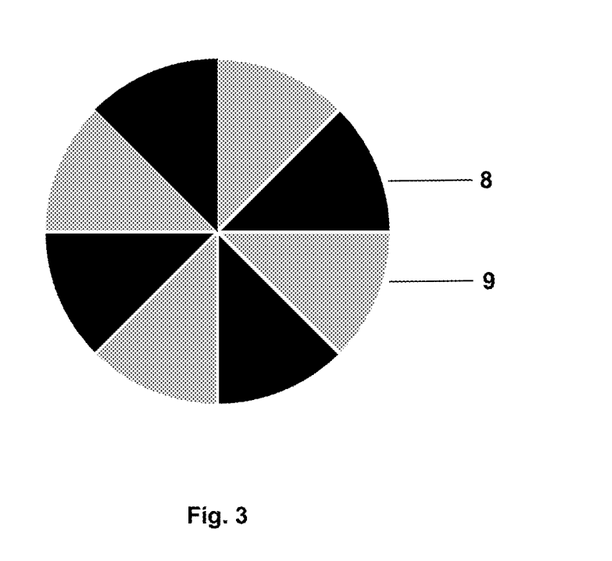
FIG. 3 shows schematically and in exemplified form a pie-segment filament construction which can especially be used in a spunbond nonwoven layer in accordance with the present invention.

In FIG. 3, a pie-segment filament construction is shown. This construction is useful for spunbond nonwoven layer 2, 3, 5 and/or 6 as well as for multicomponent staple fibres (c2). The shown pie-segment filament construction has eight segments alternatingly consisting of PET segments 8 and copolyester segments 9. It may alternatively have a filament construction with 16, 32 or 64 segments alternatingly consisting of PET segments 8 and copolyester segments 9. During a moulding process, the low melting copolyester melts and provides rigidity to the material.

In FIG. 4, a sheath-core filament construction is shown. This construction is useful for spunbond nonwoven layer 2, 3, 5 and/or 6 as well as for multicomponent staple fibres (c2). The shown bicomponent filament construction consists of a sheath 10 consisting of low melting copolymer and of a core consisting of PET 11 having a higher melting point. During a moulding process, the low melting copolyester melts and provides rigidity to the material.

Figure 5:
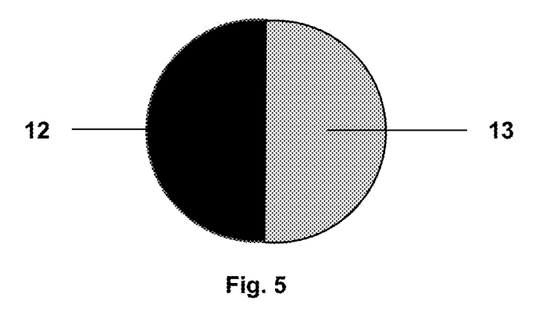
FIG. 5 shows schematically and in exemplified form a side-by-side filament construction which can especially be used in a spunbond nonwoven layer in accordance with the present invention.

In FIG. 5, a side-by-side filament construction is shown. This construction is useful for spunbond nonwoven layer 2, 3, 5 and/or 6 as well as for multicomponent staple fibres (c2). The shown side-by-side filament construction consists of one side 13 consisting of the low melting copolymer and of another side 12 consisting of PET having a higher melting point. During the moulding process, the low melting copolyester melts and provides rigidity to the material.

EXAMPLES

Example 1—Cold Mould Process

Materials for the construction of a nonwoven laminate and for an underbody shield comprising the nonwoven laminate:
Staple fibres (for core layer 4): 50% monocompoment staple fibres (c1):
Material: r-PET
Staple length: 64 mm
Fineness: 6.7 dTex
50% bicomponent staple fibres (c2):
Configuration: sheath-core Material: sheath of PET; core of copolyester having a melting point of 180° C.
Staple length: 51 mm
Fineness: 5 dTex
Spunbond (for outer layers 2 and 6):
Material: 90% PET;
10% copolyester of PET (CoPET)
Basis weight: 90 g/m²
Thickness: 0.33 to 0.59 mm
Filament diameter: 25-60 µm
CoPET spunbond (for adhesive layers 3 and 5):
100% copolyester of PET (CoPET)
Basis weight: 16 g/m²
Thickness: 0.15 to 0.45 mm
Filament diameter: 25-60 µm The staple fibres were mixed in a ratio of 50%:50%. The staple fibres were then carded, cross-lapped and needled. The needles used were Groz-Beckert 36 gg fine needles with a total needling intensity of 350 needles/cm². The needling depth was set at 10 mm on both sides. The needled material was then passed through a through air oven which was heated up to 200° C. at a rate of 10° C./min. This heating of the needled material activated the bicomponent fibres. This made the material coming out of the oven to be stiff. A core layer 4 was thereby produced. The core layer 4 was then passed through a set of calendar rollers where the CoPET adhesive layers 3 and 5 and outer layers 2 and 6 were introduced on both sides. The calendar pressure was set at 25 bars on both sides and at a temperature of 200° C., thereby producing a nonwoven laminate. In this nonwoven laminate, all layers 2 to 6 are melt-bonded to each other. None of layers 2 to 6 is mechanically bonded to any of the other layers. The produced laminate was then sheet-cut.

Underbody Shield:

The sheet-cut material was introduced into an oven heated up to 210° C. for 3 min (in case of an through air oven) or 1 min (in case of an infra-red oven). The material became soft due to the heat. It was then transferred immediately to a cold press where the material was moulded at high pressure (50 tons or more).

Acoustic Measurements:

Samples of produced underbody shields were tested for their acoustics properties in an instrument called Alpha-Cabin. In an Alpha-Cabin, the tested sample is laid either near to the wall or the ground with an air gap of 2 mm. The absorption coefficient of the samples is then measured by a series of sensors in the cabin. The results of the Alpha-cabin test for samples having a moulded thickness of 3 mm, 4 mm and 5 mm are shown in Table 1 below.

TABLE 1

| Frequency | Moulded thickness | | |
|---|---|---|---|
| (Hz) | 3 mm | 4 mm | 5 mm |
| 250 | 0.02 | 0.03 | 0.03 |
| 315 | 0.02 | 0.01 | 0.03 |
| 400 | 0.01 | 0.02 | 0.05 |
| 500 | 0.01 | 0.02 | 0.08 |
| 630 | 0.04 | 0.05 | 0.10 |
| 800 | 0.05 | 0.06 | 0.14 |
| 1000 | 0.07 | 0.11 | 0.22 |
| 1250 | 0.11 | 0.15 | 0.26 |
| 1600 | 0.17 | 0.23 | 0.37 |
| 2000 | 0.21 | 0.31 | 0.47 |

TABLE 1-continued

| Frequency | Moulded thickness | | |
|---|---|---|---|
| (Hz) | 3 mm | 4 mm | 5 mm |
| 2500 | 0.33 | 0.43 | 0.61 |
| 3150 | 0.44 | 0.53 | 0.67 |
| 4000 | 0.52 | 0.62 | 0.72 |
| 5000 | 0.68 | 0.74 | 0.78 |
| 6300 | 0.75 | 0.81 | 0.85 |
| 8000 | 0.82 | 0.86 | 0.90 |
| 10000 | 0.83 | 0.91 | 0.90 |

Figure 6:
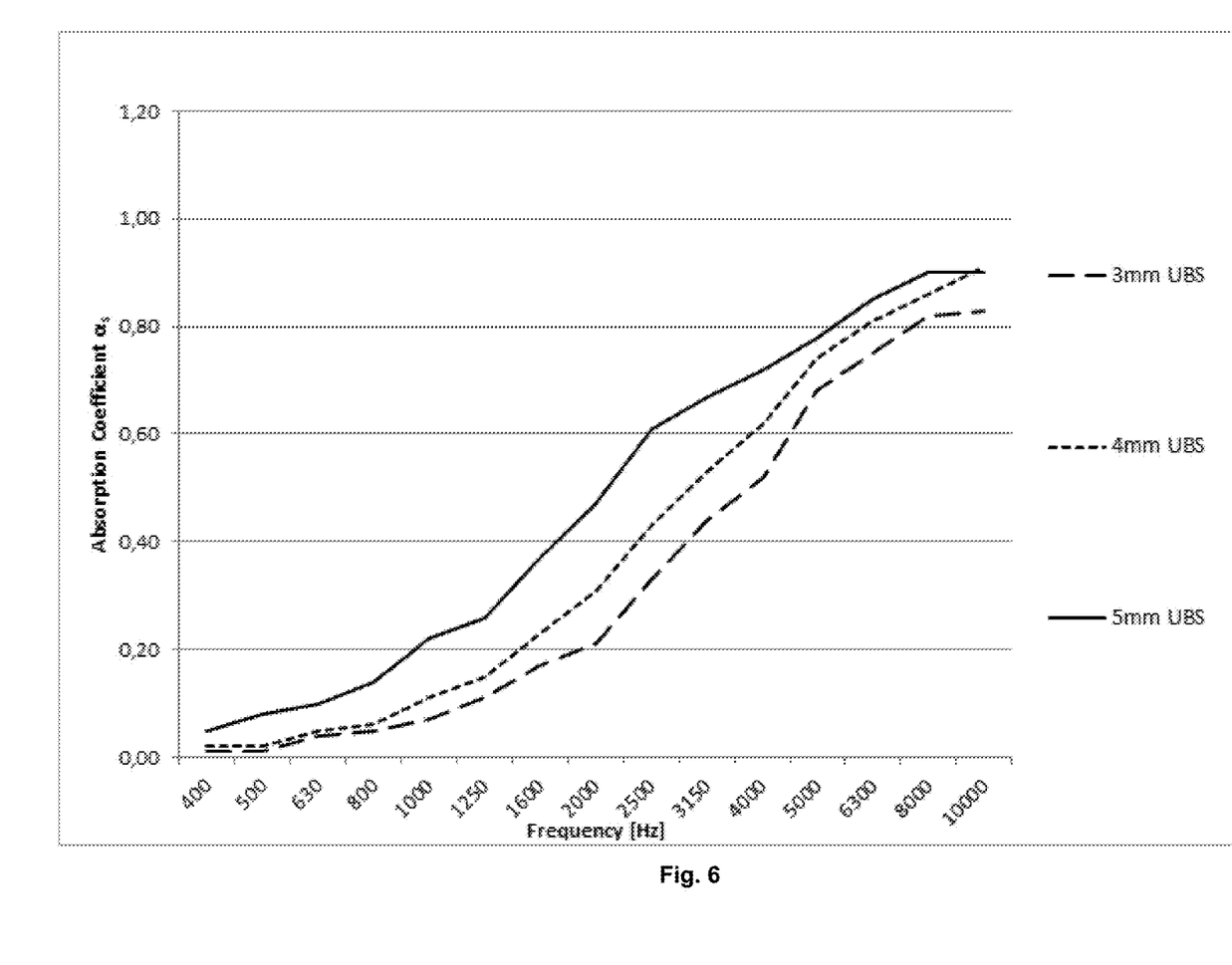
FIG. 6 shows the results of acoustic measurements on nonwoven laminates in accordance with the present invention.

In FIG. 6, the results for the flat moulded samples with a thickness of 3 mm, 4 mm and 5 mm are graphically shown by applied sound frequency (abscissa) vs. absorption coefficient as (ordinate). The higher the sound absorption coefficient αs, the better is the acoustic performance of the tested sample. It is seen that the sound absorption coefficient increases with increasing thickness of the tested sample.

Example 2—Cold Mould Process

In the cold mould process, a nonwoven laminate is preheated at a temperature range between 180° C. and 220° C. for 1 to 5 min depending on the basis weight. This is to activate the low melting copolyester which acts as a binder. By activating the binder, it melts and forms a kind of glue between the virgin or recycled PET fibres. It also acts as a glue between the staple fibre nonwoven layers and the spunbond nonwoven layers. After activating, the nonwoven laminate is placed in a compression mould. The compression mould may then compress all or a portion of the nonwoven laminate at a tonnage of 50 tons to 200 tons. The nonwoven laminate is allowed to remain in the mould for up to 60 seconds. The compressed nonwoven laminate is allowed to cool inside or outside the mould to allow the copolyester fibres in the staple fibres and in the spunbond construction to cool below their melting point. Thereafter, the nonwoven laminate is converted to its final shape. The final thickness of the material is between 2 mm and 6 mm depending on the requirements of the intended application. The nonwoven laminate is then trimmed as required, which may be achieved by mechanical, thermal or waterjet cutting.

TABLE 2

| Properties | Unit | Standard | Only staple fibre (comparative) | SF with needled spunbond (comparative) | Nonwoven laminate (inventive) |
|---|---|---|---|---|---|
| Weight | g/m² | DIN EN 29073-1 | 1000 | 980 | 1000 |
| Bending strength | MPa | ISO 178 | 333 | 300 | 438 |
| Tensile strength | N | ASTM 5034 | 640 | 708 | 970 |
| Tear strength | N | DIN EN 29073-3 | 91 | 96 | 165 |

In Table 2, the "Only staple fibre" sample was a 2 mm thick single layer needled PET web comprised of 50% recycled polyester staple fibre and the remaining 50% PET bicomponent fibre. The bicomponent fibre had a PET core with a PET copolymer sheath with a melting point in the range of 75° C. to 230° C.

"SF with needled spunbond" refers to a layered structure in accordance with the disclosure in US 2016/0288451 A1. The layered structure had two outer PET spunbond layers at a basis weight of 90 g/m2 and a middle layer of needled staple PET staple fibres at a basis weight of 800 g/m2. The two outer PET spunbond layers were needled into the middle layer of needled staple PET staple fibres. The two outer PET spunbond layers were thereby mechanically bonded to the middle layer of needled staple PET staple fibres. No melt-bonding of those layers to each other occurred. The layered structure had an initial overall thickness of 7.0 mm. The layered structure was then compression moulded to a final thickness of 2 mm.

"Nonwoven laminate" refers to a nonwoven laminate in accordance with the present invention. The nonwoven laminate had two outer PET spunbond layers at a basis weight of 90 g/m² and a middle layer of heat-set needled PET staple fibres at a basis weight of 800 g/m². The two outer PET spunbond layers were melt-bonded to the middle layer of heat-set needled PET staple fibres. No mechanical bonding of those layers to each other occurred. The nonwoven laminate had an initial overall thickness of 7.0 mm. The nonwoven laminate was then compression moulded to a final thickness of 2 mm. The needled staple fibres with a density of 650 g/m² were sent into the oven for heat-setting. The heat-setting resulted in shrinkage. After shrinkage a desired weight of 800 g/m² was obtained. The spunbond is not needled onto the core, but instead melt-bonded. The used spunbond had a higher amount of copolyester, which ensured better bonding between the layers.

As can be seen from Table 2, the results of the mechanical property testing confirm that the nonwoven laminate sample significantly increases the bending, tear and tensile strength. Without being bound to theory, it is believed that the reason for the increase of the bending strength is the presence of a high amount of binder material, which holds the spunbond straight enough to produce a flat surface. The inclusion of spunbond itself helps to the increase the tear strength because of the endless calendared filaments in the spunbond.

Example 3—Hot Mould Process

In the hot mould process, the nonwoven laminate is placed between a pair of hot compression mould plates. The plates are then allowed to close to a desired thickness which is less than the thickness of the material. For example, if the nonwoven laminate thickness is 6 mm, the thickness between the plates is between 2 mm and 5 mm. The moulding plates are heated to a temperature in the range of 180° C. to 220° C. The nonwoven laminate then is compressed for 1 to 3 min depending on the basis weight, which is to activate the low melting copolyester (or binder). By activating the binder, it melts and forms a glue between the virgin or recycled PET fibres. Also, it acts as a glue between the staple fibres and the spunbond. The compression of all or of a portion of the nonwoven laminate may be done at a tonnage of 50 tons to 200 tons. The compressed nonwoven laminate is allowed to cool inside or outside the mould to allow the binder fibres in the staple fibres and in the spunbond construction to cool below their melting point. Thereafter, the nonwoven laminate is converted to its final shape. The final thickness of the material is between 2 mm and 6 mm depending on the requirement of the intended application. The nonwoven laminate is then trimmed as required, which may be achieved by mechanical, thermal or waterjet cutting.

TABLE 3

| Properties | Unit | Standard | Only staple fibre (comparative) | SF with needled spunbond (comparative) | Nonwoven laminate (inventive) |
|---|---|---|---|---|---|
| Weight | g/m² | DIN EN 29073-1 | 1000 | 980 | 1000 |
| Bending strength | MPa | ISO 178 | 575 | 471 | 760 |
| Tensile strength | N | ASTM 5034 | 1021 | 1114 | 1420 |
| Tear strength | N | DIN EN 29073-3 | 93 | 120 | 158 |

The "Only staple fibre", the "SF with needled spunbond" and the "Nonwoven laminate" were the same as described in Example 2. As can be seen from Table 3, similar trends as in Table 2 are noticed which confirm the significant enhancement of bending, tear and tensile strength for the nonwoven laminate sample. The values of bending strength and tensile strength are higher for hot mould samples in comparison with cold mould samples. Without being bound to theory, it is believed that this is because of the hot surface of the plates being in contact with the sample directly, which in turn melts the fibres and forms a thin plastic sheet on both sides of the needled web.

Example 4—Weight Variation

Mechanical properties were also tested for moulded nonwoven laminate samples having a thickness of 2 mm at varying weights of 1000, 1200 and 1400 g/m². The test results are shown in Table 4.

TABLE 4

| Properties | Unit | Standard | Nonwoven laminate | | |
|---|---|---|---|---|---|
| Weight | g/m² | DIN EN 29073-1 | 1000 | 1200 | 1400 |
| Bending strength | MPa | ISO 178 | 438 | 500 | 594 |
| Tensile strength | N | ASTM 5034 | 970 | 1172 | 1315 |
| Tear strength | N | DIN EN 29073-3 | 165 | 201 | 222 |

As can be seen from Table 4, a linear increase in the mechanical properties with respect to the basis weight was observed. A higher weight means a higher amount of staple fibres, as the weight of spunbond remained the same. A higher amount of staple fibres results in a higher percentage of bicomponent fibres and hence in more binder material, which in turn results in more stiffness and enhanced mechanical property values.

Example 5 (Comparison)—Mechanically Bonded Nonwoven Laminate

Figure 7A:
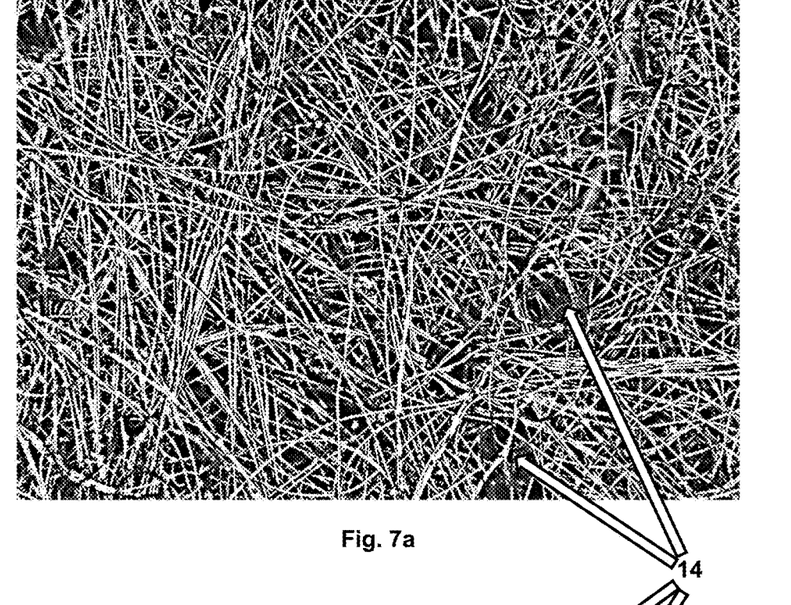
FIGS. 7a to 7c are microscopic images of a mechanically bonded (needled) nonwoven produced according to US 2016/0288451 A1.
Figure 7B:
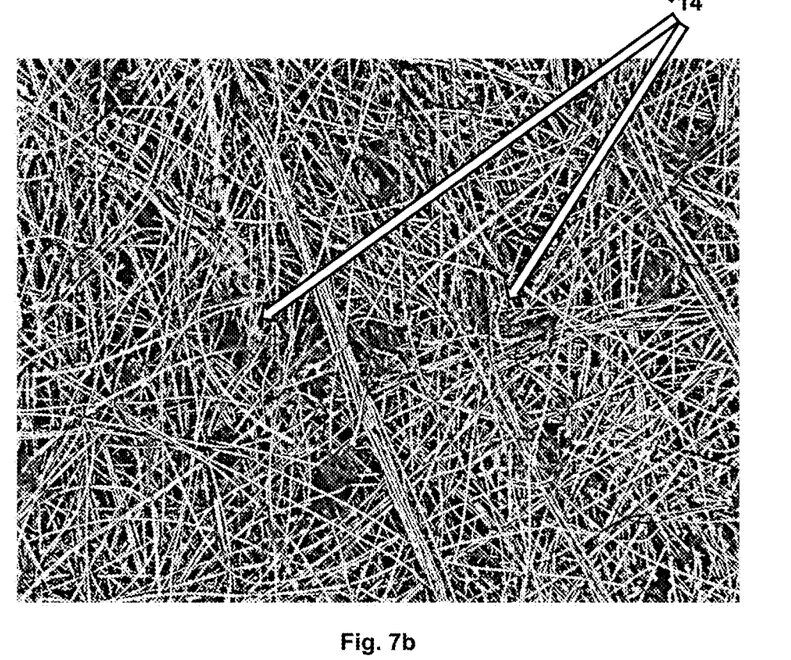
Figure 7C:
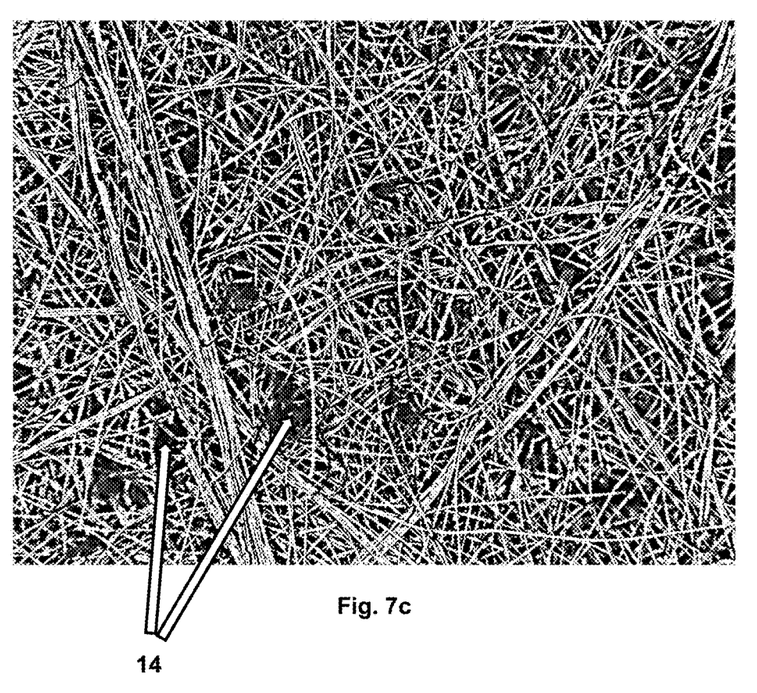

FIGS. 7a, 7b and 7c are microscopic images of a needled nonwoven produced according to US 2016/0288451 A1. The fibre layers thereof have been joined mechanically be needling, i.e. they are mechanically bonded to each other. Reference numeral 14 indicates regions of lower fibre density which are due to the needling. It is seen that some fibres of one layer (the core layer) extend into and penetrate through the adjacent layer (spunbond outer layer). An intermingling of the respective fibres is thereby formed, which leads to a mechanical bond between the two layers. Such a bonding may lead to deformation upon further compression and moulding of the layered structure, resulting in an uneven product with a wavy appearance (elephant skin).

The inventive nonwoven laminate can avoid such drawbacks by exclusively melt-bonding the layers of the laminate to each other. No mechanical bonding is thus present in the inventive laminate, only melt-bonded layers are present.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A nonwoven laminate, comprising in order
   a spunbond nonwoven layer (A) comprising fibres, which comprise polyethylene terephthalate (PET) and copolyester;
   an optional spunbond nonwoven layer (B) comprising fibres, which comprise polyethylene terephthalate (PET) and copolyester, the nonwoven layer (B) having a higher copolyester content than nonwoven layer (A);
   a needled staple fibre nonwoven layer (C), comprising:
     monocomponent polyethylene terephthalate (PET) staple fibres (c1), and
     multicomponent staple fibres (c2), which comprise at least a polyethylene terephthalate (PET) component and a copolyester component;
   an optional spunbond nonwoven layer (D) comprising fibres, which comprise polyethylene terephthalate (PET) and copolyester, the nonwoven layer (D) having a higher copolyester content than nonwoven layer (E);
   a spunbond nonwoven layer (E) comprising fibres, which comprise polyethylene terephthalate (PET) and copolyester;
   wherein all layers are melt-bonded to each other,
   wherein a melting point of the copolyester in spunbond nonwoven layers (A) and (E) is higher than a melting point of the copolyester in needled staple fibre nonwoven layer (C) by at least 30 degrees Celsius,
   wherein non of layer (A), (B), (C), (D), and (E) is mechanically bonded to any other of layers (A), (B), (C), (D) and (E), and
   wherein none of the layers contain a polyolefin.

2. The nonwoven laminate of claim 1, wherein the needled staple fibre nonwoven layer (C) is heat-shrunk.

3. The nonwoven laminate of claim 1, wherein none of the layers contain inorganic reinforcements.

4. The nonwoven laminate of claim 1, wherein the laminate has at least one of the following characteristics:
- a bending strength according to ISO 178:2019-04 of ≥330 MPa;
- a tensile strength according to ASTM 5034:2009 of ≥780 N; and/or
- a tear strength according to DIN EN 29073-3:1992-08 of ≥110 N.

5. The nonwoven laminate of claim 1, wherein the copolyester in layers (A), (B), (C), (D) and (E) is a copolymer of polyethylene terephthalate, said copolymer having a melting point of ≤240° C.

6. The nonwoven laminate of claim 1, wherein layers (A) and (E) each comprise 10% to 70% copolyester.

7. The nonwoven laminate of claim 1, wherein at least one of comprising spunbond nonwoven layer (B) and spunbond nonwoven layer (D) are present and wherein
- the fibres of spunbond nonwoven layer (B) and/or spunbond nonwoven layer (D) comprise copolyester; and/or
- spunbond nonwoven layer (B) and/or spunbond nonwoven layer (D) have a basis weight according to DIN EN 29073-1:1992-08 of 1 to 100 g/m2.

8. The nonwoven laminate of claim 1, wherein needled staple fibre nonwoven layer (C)
- comprises 10 to 90% of monocomponent staple fibres (c1) and 10 to 90% of multicomponent staple fibres (c2), and/or
- has a basis weight according to DIN EN 29073-1:1992-08 of ≤1700 g/m2.

9. The nonwoven laminate of claim 1 wherein:
the nonwoven laminate comprises layers (A), (B), (C), (D) and (E);
the copolyester in layers (A), (B), (C), (D) and (E) is a copolymer of polyethylene terephthalate, said copolymer having a melting point of 160 to 240° C.;
each of spunbond nonwoven layer (B) and spunbond nonwoven layer (D) comprises copolyester and each has a basis weight according to DIN EN 29073-1:1992-08 of 10 to 20 g/m2; and
needled staple fibre nonwoven layer (C) comprises 40 to 60% of monocomponent staple fibres (c1) and 40 to 60% of multicomponent staple fibres (c2).

10. The nonwoven laminate of claim 1 wherein:
the nonwoven laminate comprises neither spunbond nonwoven layer (B) nor spunbond nonwoven layer (D);
the copolyester in layers (A), (C) and (E) is a copolymer of polyethylene terephthalate, said copolymer having a melting point of 160 to 240° C.; and
needled staple fibre nonwoven layer (C) comprises 40 to 60% of monocomponent staple fibres (c1) and 40 to 60% of multicomponent staple fibres (c2).

11. A moulded article comprising a nonwoven laminate according to claim 1.

12. A vehicle comprising: a body; and an underbody shield comprising the nonwoven laminate according to claim 1.

13. A process for producing the nonwoven laminate according to at least of claim 1, comprising:
preparing a needled staple nonwoven layer (C) by needling;
providing in order layers (A) to (E); and
melt-bonding layers (A) to (E) to each other.

14. The nonwoven laminate of claim 3, which does not contain glass fibres.

15. The nonwoven laminate of claim 6, wherein layers (A) and (E) each comprise at least 30% copolyester.

16. The nonwoven laminate of claim 1, wherein layers (B) and (D) are excluded and the copolyester in spunbond nonwoven layers (A) and (E) has a melting point of 205 to 240 degrees Celsius.

17. The nonwoven laminate of claim 1, wherein layers (B) and (D) are excluded and the copolyester in needled staple fibre nonwoven layer (C) has a melting point of 170 to 190 degrees Celsius.

* * * * *